(12) United States Patent
Sareyka et al.

(10) Patent No.: US 8,839,583 B2
(45) Date of Patent: Sep. 23, 2014

(54) SUSPENDED CEILING GRID ADAPTER

(75) Inventors: Brett W. Sareyka, Glen Mills, PA (US); Joshua L. Neal, Elverson, PA (US)

(73) Assignee: Worthington Armstrong Venture, Malvern, PA (US)

( * ) Notice: Subject to any disclaimer, the term of this patent is extended or adjusted under 35 U.S.C. 154(b) by 0 days.

(21) Appl. No.: 13/573,280

(22) Filed: Sep. 8, 2012

(65) Prior Publication Data

US 2014/0069041 A1    Mar. 13, 2014

(51) Int. Cl.
*E04F 13/21*    (2006.01)

(52) U.S. Cl.
USPC .................................. 52/506.05; 52/664

(58) Field of Classification Search
CPC ......... E04B 9/067; E04B 9/122; E04B 9/125; E04B 9/127
USPC ............................ 52/506.05–506.07, 664–666
See application file for complete search history.

(56) References Cited

U.S. PATENT DOCUMENTS

| | | | |
|---|---|---|---|
| 5,044,138 A * | 9/1991 | Zaccardelli et al. | ............. 52/667 |
| 5,046,294 A * | 9/1991 | Platt | ............. 52/506.06 |
| 5,149,221 A | 9/1992 | Slapsys | |
| 5,154,031 A * | 10/1992 | Wall | ............. 52/506.06 |
| 5,839,246 A | 11/1998 | Ziegler et al. | |
| 6,178,712 B1 | 1/2001 | Sauer | |
| 7,293,393 B2 | 11/2007 | Kelly et al. | |
| 7,673,429 B2 | 3/2010 | Frecska | |
| 7,926,238 B2 | 4/2011 | Sareyka et al. | |
| 7,930,864 B2 | 4/2011 | Wendt | |

* cited by examiner

*Primary Examiner* — Jeanette E Chapman
*Assistant Examiner* — Daniel Kenny
(74) *Attorney, Agent, or Firm* — Eugene Chovanes

(57) ABSTRACT

An L-shaped adapter that secures a single cross beam to a main beam, in a suspended ceiling.

The adapter is applied to a prior art connection designed to connect opposing cross beams to each other and to a main beam.

1 Claim, 6 Drawing Sheets

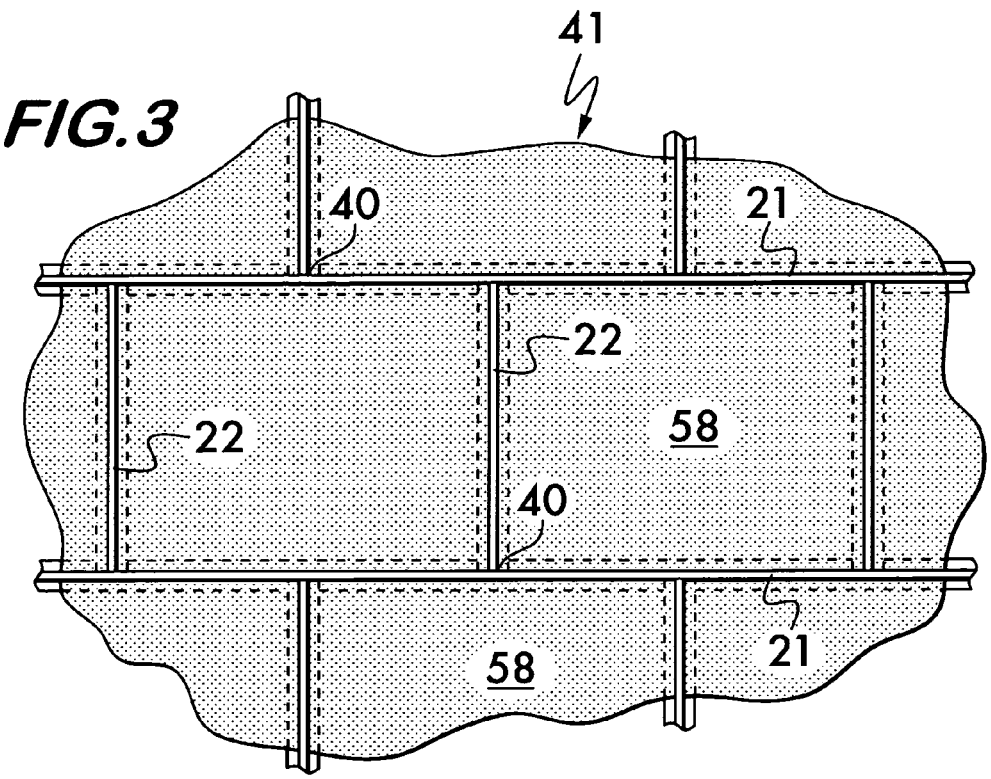
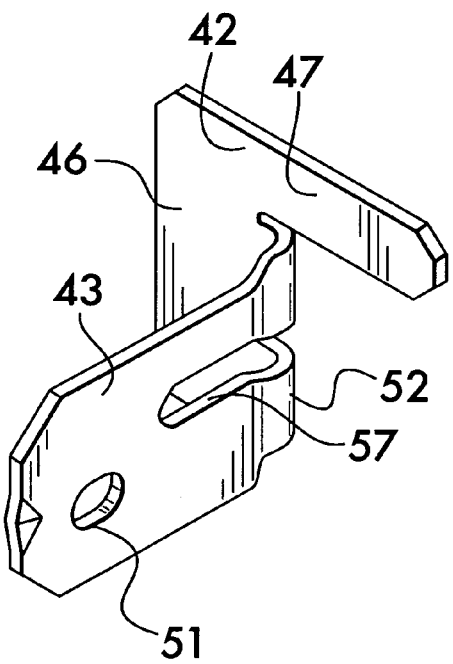

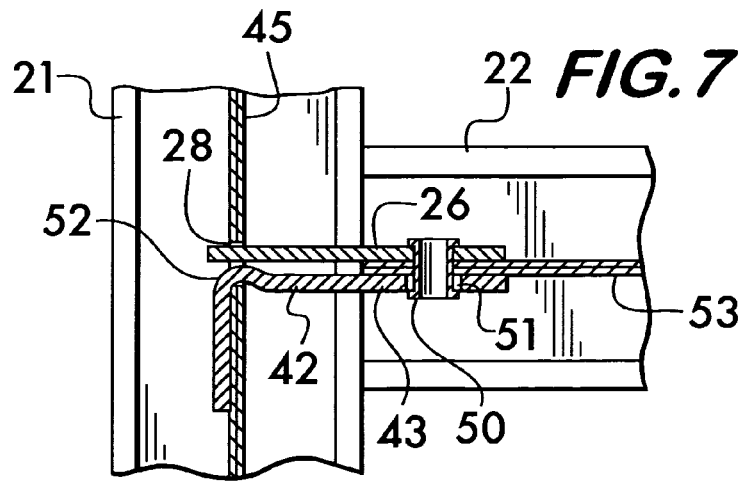
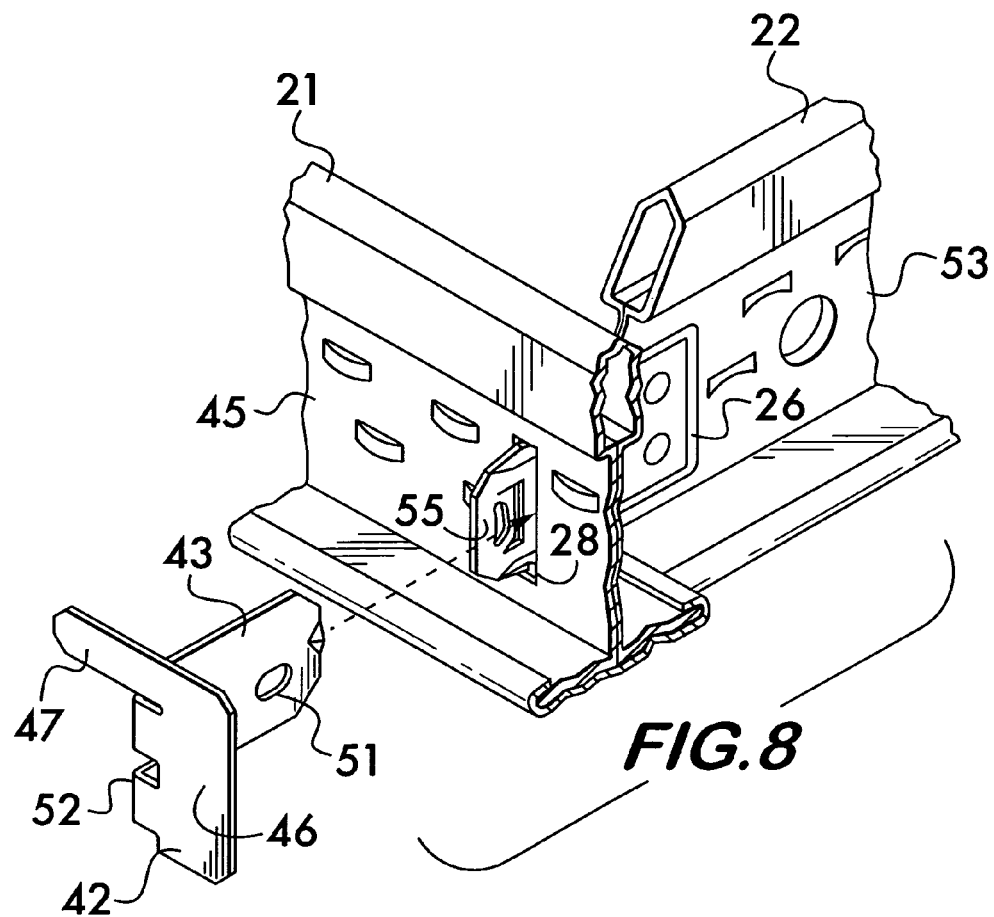

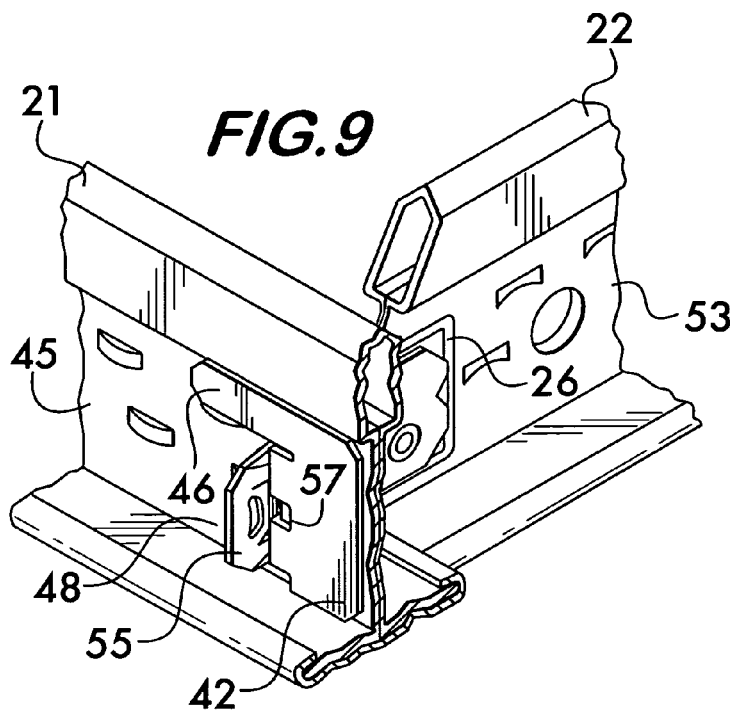
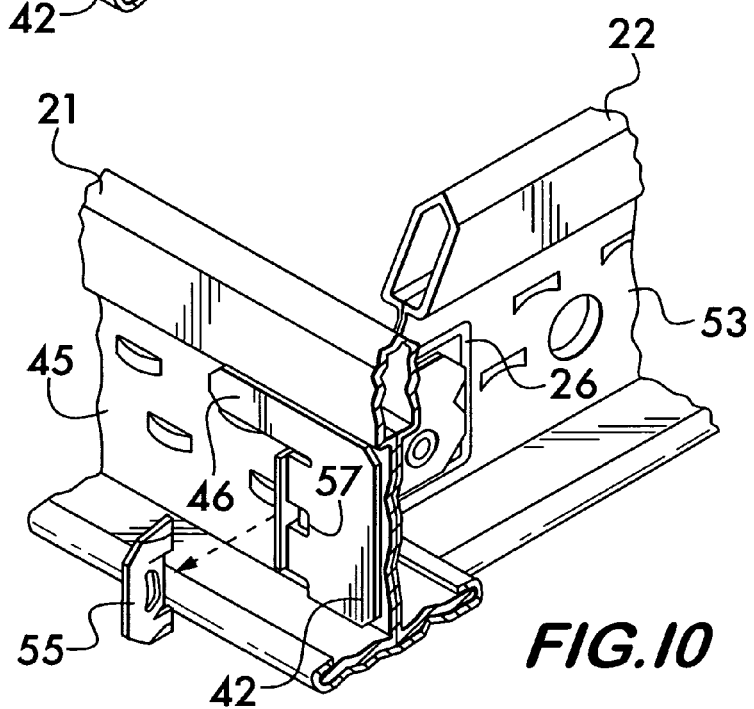

SUSPENDED CEILING GRID ADAPTER

BACKGROUND OF THE INVENTION

1. Field of the Invention

Suspended ceilings are used extensively in commercial and industrial buildings. In such ceilings, a metal grid framework of interconnected main beams and cross beams is hung from a structural element by wires. The grid supports acoustical panels in rectangular openings formed in the grid.

2. Prior Art

Suspended ceilings having metal beams interconnected into a grid that supports panels are well known. U.S. Pat. Nos. 5,839,246 and 6,178,712, for instance, incorporated herein by reference, show such ceilings.

Such prior art suspended ceilings generally have a grid of inverted T-beams, rolled from sheet metal, arrayed in rectangular fashion that is suspended from a structural ceiling by wires. The grid is created from main beams that extend longitudinally parallel to each other, and opposing cross beams connected at right angles to a main beam, to form repetitive rectangles that receive and support panels. The repetitive rectangles are generally formed in even rows, and extend side-by-side. The connections are formed by creating slots in the main beams that receive identical connectors on the end of the cross beams. In a connection, the connectors on each of a first and second opposing cross beams are connected through a slot in the main beam to each other, and to the main beam, so that a secure and strong connection results between the opposing cross beams, and the main beam. If only a first connector is inserted into the slot, without being connected to an opposing identical second connector, the connection will not hold. The first connector is only loosely held in the slot until the second connector on the second opposing beam is forced into the slot along the first connector.

The present invention relates to such connection.

SUMMARY OF THE PRESENT INVENTION

The adapter of the present invention enables a strong connection between a single cross beam and a main beam, through a slot in the main beam, in a ceiling grid, using some of the same prior art connector elements used to make a two cross beam connection through a slot, as described above. Such a connection is, in some instances, desired for a decorative effect, wherein an area, or areas, of the ceiling are clear of a cross beam that extends in line with an opposing cross beam. This results in a type of running brick bond design, such as used in a brick wall. In other instances, the omission of a second opposing cross beam is necessary to create an open area to accommodate a ceiling fixture, such as a fluorescent light fixture, or a ventilator.

It is necessary under building codes that all cross beams be retained in their connections under stress, for instance, of a 180 pound pull, particularly during seismic events, so the ceiling does not collapse. The connection of the invention between a single cross beam and, using the adapter disclosed, a main beam, complies with such a requirement, based on laboratory tests.

The present invention comprises an L-shaped adapter. A first leg of the adapter is inserted from the side opposite the first cross beam, through the slot in the main beam, alongside a first connector on the opposing first cross beam, that has already been inserted into the slot. The adapter provides a means to keep the connector on the first cross beam engaged with the main beam, since the adapter occupies the space in the slot that in the prior art is occupied by the omitted second connector on the end of the omitted second beam.

The first leg of the L-shaped adapter extends to and along the web of the first cross beam already in the slot, and is secured to the cross beam by, for instance, a rivet.

The second leg of the L-shaped adapter extends along the web of the main beam, on the side of the main beam opposite the first cross beam.

This arrangement prevents a pull out of the first cross beam from the slot in the main beam, under stress, such as in a seismic event.

The present connection, notwithstanding there is an omitted second connector and second cross beam from the connection of the prior art, will retain its resistance to separation of the first cross beam and first connector, in compliance with governing codes, from the main beam, based on laboratory tests.

In summary, with the present invention, a conventional prior art suspended ceiling designed to have opposing first and second cross beams connect with each other, and with a main beam, can be readily adapted to a connection having only a single first beam connected through a slot in the main beam.

BRIEF DESCRIPTION OF THE DRAWINGS

FIG. 3 is a view looking downward of a suspended ceiling that is using the adapter of the invention to connect a first cross beam only to a main beam, to create a running bond effect.

FIG. 4 is a perspective view of the adapter of the invention.

FIG. 7 is a sectional view of the connection of the invention taken on the line 7-7 in FIG. 6.

FIG. 8 is a perspective view of the connection of the invention with a first cross beam inserted into the slot of a main beam, and the adapter about to be inserted into the slot, from the side opposite the first cross beam.

FIG. 9 is a perspective view of the connection of the invention, showing a portion of the connector on the first cross beam extending beyond the web of the main beam, on the side opposite the first cross beam, with the adapter of the invention in place.

FIG. 10 is the perspective view of FIG. 9, with the portion of the connector extending beyond the web of the main beam cut away.

DETAILED DESCRIPTION OF THE INVENTION

Prior Art

Figure 1:
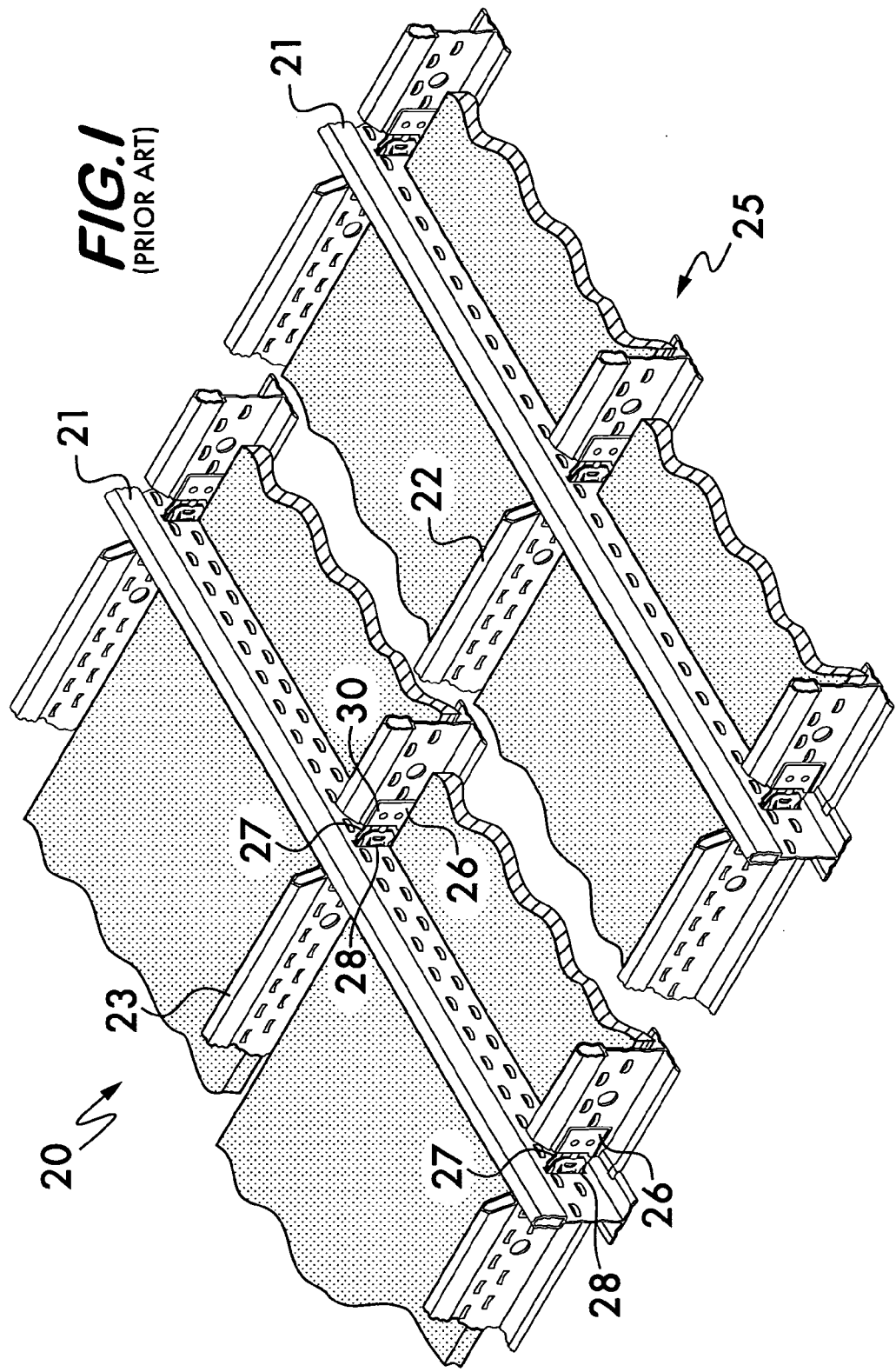
FIG. 1 is a perspective view taken from above, of a prior art suspended ceiling.

There is shown in FIG. 1 a prior art suspended ceiling 20 having parallel spaced main beams 21 and first and second identical opposing cross beams 22 and 23. First cross beam 22 has affixed at its end connector 26, and second cross beam 23 has affixed at its end identical connector 27. The connectors 26 and 27 extend through a slot 28 in the main beam 21, from opposing sides of the main beam 21, and lock with each other (sometimes styled a "handshake" in the prior art) and with the main beam 21, to form a connection 30.

As well known in the art, such a connection 30 must have opposing connectors, (such as 26 and 27) extending in the slot 28 beside each other in close contact with each other. A single connector in the slot, such as connector 26, simply pulls out since a single connector in the slot is a loose fit. A first cross beam connector 26 in the slot, is designed to lock with the opposing connector 27 in the slot in a confined space. The opposing first and second connectors 26 and 27 fully occupy the slot. A flexible tab 31 flexes when a second connector 27 goes through a slot, and then expands to lock to the slot 28.

Figure 2:
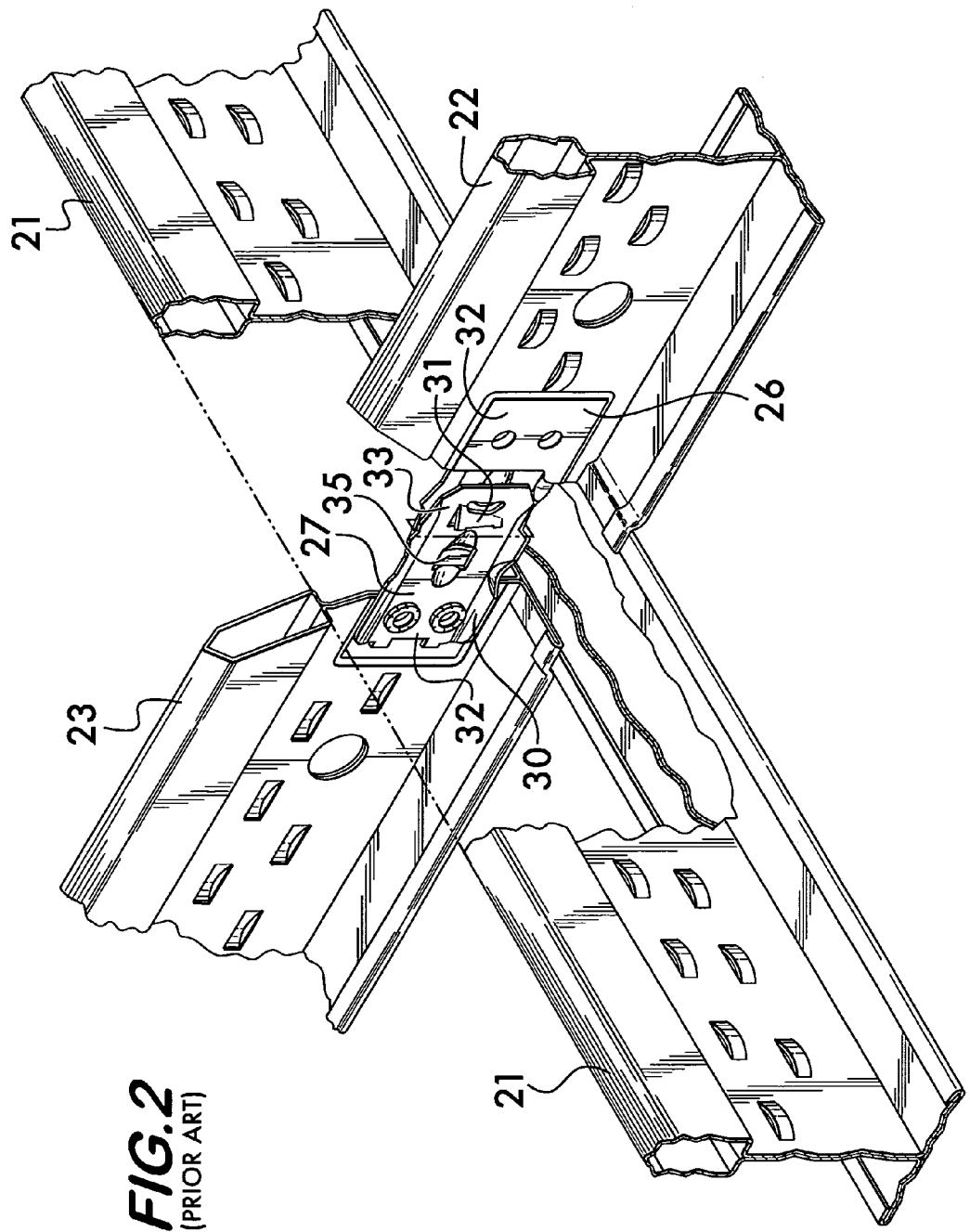
FIG. 2 is an enlarged perspective view taken from above of a connection between a main beam and opposing cross beams, in the ceiling shown in FIG. 1, with a portion of the connection broken away.

As seen in FIGS. 1 and 2, a typical connector 26 has a body portion 32 and the tab 33 that engages the side of the slot 28 to prevent withdrawal when opposing connectors 26 and 27 are in the slot. A barb 35 on each of the first and second connectors 26 and 27 that engage one another when the second opposing connector 27 on second opposing cross beam 23 is inserted into the slot 28. Such an arrangement is shown in detail in U.S. Pat. Nos. '246 and '712 as referred to above.

The present invention is concerned with adapting a prior art connection 30 as described above, with a first 22 and second 23 opposing cross beam, into a connection 40 between a single first cross beam 22, and a main beam 21, that results in a grid 41 as depicted in FIG. 3. One or more of connection 40 can be used in such grid 41.

In the connection of the invention 40, the second cross beam 23 and second connector 27 are omitted, and the adapter 42 of the invention inserted.

The adapter 42, as seen in FIG. 4, has an angle shape, with one leg 43 of the adapter 42 intended to lie along the main beam web 45, through the slot 28 of the main beam 21, alongside the connector 26 on the first opposing cross beam 22. Adapter 42 replaces the connector 27 on a second opposing cross beam 23, which is being omitted. First leg 43 of the adapter 42 of the invention keeps the prior art first connector 26 in place against the edge of the slot 28 of the main beam 21, to prevent withdrawal, as did the omitted second connector 27 in the prior art.

Figure 5:
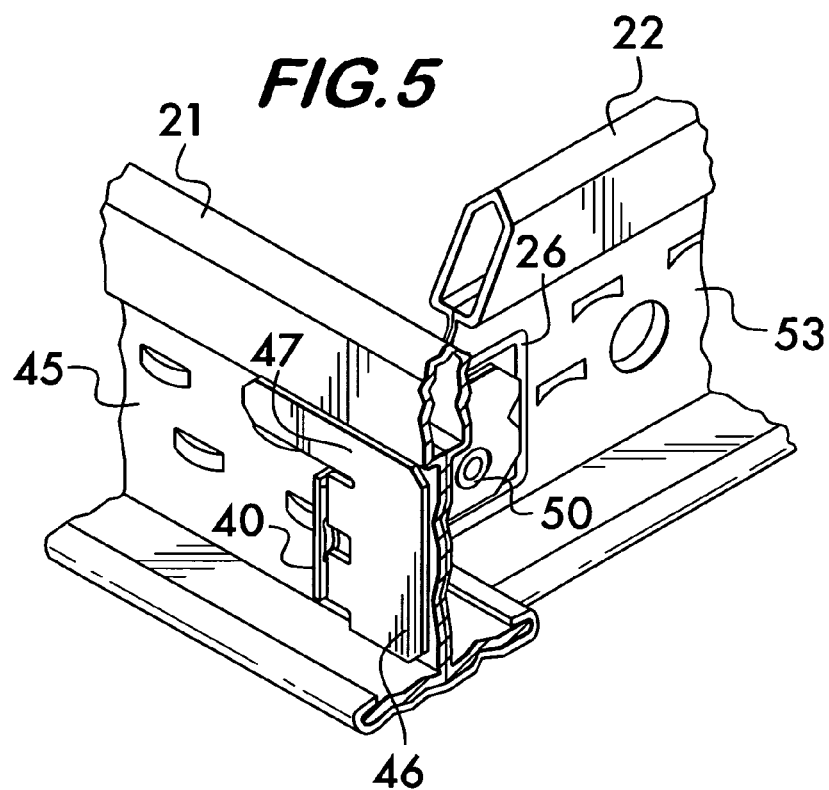
FIG. 5 is a perspective view of a connection between a main beam, and a single first cross beam, using the adapter of the invention.

The second leg 46 of the adapter 42, as seen in FIG. 5, lies along the web 45 of the main beam 21. The leg 46 has a larger portion 47 intended to extend above and across the slot 28.

Second leg 46, of adapter 42, extends along web 45 of the main beam 21, on the side of connector 26 that permits the connector to extend beyond the web 45, as seen at 48, in FIG. 9.

Figure 6:
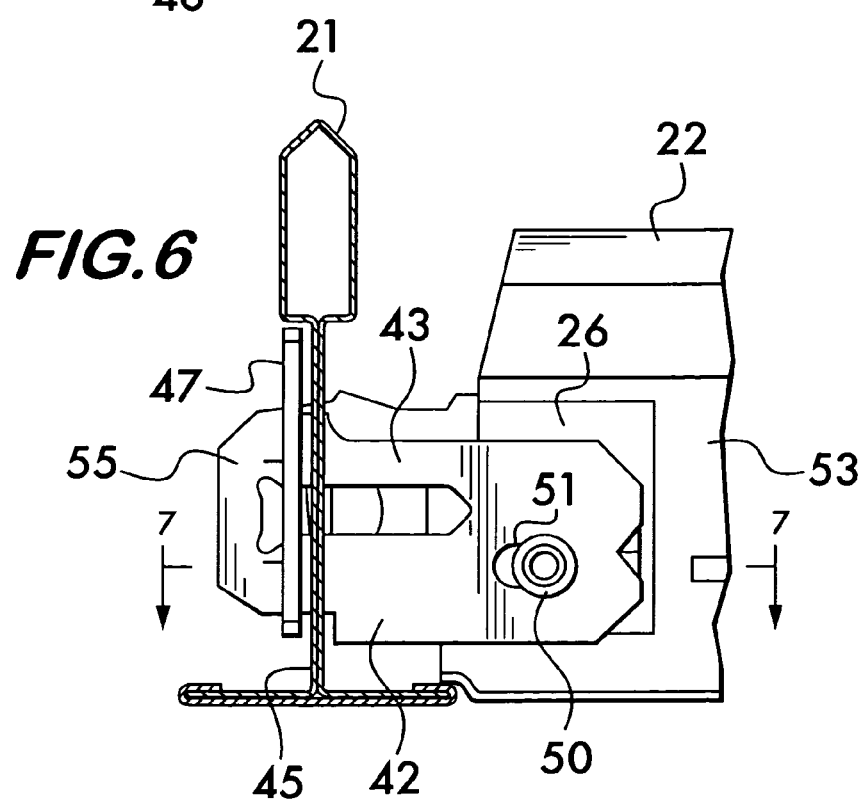
FIG. 6 is a side elevational view of the connection of FIG. 5.

In such a position, first leg 43 of adapter 42 extends through slot 28 in main beam 21 into a position as seen, for instance, in FIG. 6.

As seen in FIG. 6, first leg 43 extends along first connector 26, in place of the prior art second connector 27 shown in FIG. 2.

A rivet 50, or other fastener, as seen particularly in FIGS. 6 and 7, passes through connector 26, through web 53 and through elongated hole 51 on first leg 43.

First leg 43 of adapter 42 is slightly offset at 52 to permit the web 53 of first cross beam 22 to be sandwiched between leg 43 of adapter 42 and connector 26, as seen best in FIG. 7.

In the arrangement as shown in FIG. 9, the connection of the invention is complete, except for the end 55 of connector 26 which extends beyond web 45 on main beam 21. End 55 of connector 26 is manually cut off as seen in FIG. 10, so that there is no interference with a panel 58 that extends across the connection, as seen in FIG. 3.

In the connection of the invention 40 as described, using the adapter 42 of the invention, the first connector 26 on the first opposing cross beam 22, is prevented from withdrawing from slot 28 of main beam 21 by (1) the connection of first connector 26 to the side of the slot 28, and by (2) the adapter 42 which secures the first leg 43 of the adapter 42 to the first connector 26, with the second leg 46 of the adapter extending along, and against the web 45 of the main beam 21 on the side of the main beam 21 opposite the first cross beam 22, so the first connector 26 cannot pull out of slot 28.

Hole 51 is slotted to compensate for any variance in the position of the first cross beam 22 and connector 26 with respect to the main beam 21.

Slot 57 in leg 43 of adapter 42 permits an easier installation of the clip in its position alongside clip 26, as seen, for instance, in FIG. 7.

What is claimed is:

1. A method of adapting a connection among a main beam and opposing first and second cross beams, each of the cross beams having a connector attached thereto extending through a slot in the main beam, to a connection only between the first cross beam having a connector attached thereto extending through the slot, and the main beam, in a suspended ceiling grid, comprising:
   a) passing only the connector attached to the first cross beam through the slot;
   b) passing a first leg of an L-shaped adapter through the slot from the side opposite the first cross beam and the connector thereon until a second leg of the L-shaped adapter abuts the main beam;
   c) securing the first leg of the L-shaped adapter to the first cross beam; and
   d) manually shearing off an end of the connector on the first cross beam that extends beyond the main beam to avoid interference with a surface extending along the main beam.

* * * * *